(12) United States Patent
Zhang et al.

(10) Patent No.: US 12,505,330 B2
(45) Date of Patent: Dec. 23, 2025

(54) METHOD FOR PROCESSING DATA USING A NEURAL NETWORK

(71) Applicant: MONTAGE TECHNOLOGY (KUNSHAN) CO., LTD., Suzhou (CN)

(72) Inventors: Xun Zhang, Suzhou (CN); Shengxin Hu, Suzhou (CN)

(73) Assignee: MONTAGE TECHNOLOGY (KUNSHAN) CO., LTD., Suzhou (CN)

( * ) Notice: Subject to any disclaimer, the term of this patent is extended or adjusted under 35 U.S.C. 154(b) by 586 days.

(21) Appl. No.: 18/064,926

(22) Filed: Dec. 12, 2022

(65) Prior Publication Data

US 2023/0186046 A1 Jun. 15, 2023

(30) Foreign Application Priority Data

Dec. 14, 2021 (CN) .......................... 202111529247.9

(51) Int. Cl.
*G06N 3/02* (2006.01)
(52) U.S. Cl.
CPC ....................................... *G06N 3/02* (2013.01)
(58) Field of Classification Search
CPC ....................................................... G06N 3/02
See application file for complete search history.

(56) References Cited

U.S. PATENT DOCUMENTS

| | | | |
|---|---|---|---|
| 9,710,265 B1* | 7/2017 | Temam | G06F 9/3824 |
| 10,261,786 B2* | 4/2019 | Lacy | G06F 9/3891 |
| 10,504,022 B2* | 12/2019 | Temam | G06N 3/048 |
| 10,747,845 B2* | 8/2020 | Whatmough | G06N 3/063 |
| 11,367,246 B2* | 6/2022 | Moloney | G06T 17/05 |
| 12,260,325 B2* | 3/2025 | Song | G06N 3/063 |

\* cited by examiner

*Primary Examiner* — G. C. Neurauter, Jr.
(74) *Attorney, Agent, or Firm* — Junhe Law Office P.C.; James J. Zhu

(57) ABSTRACT

This applicant relates to a method for processing data using a neural network. The neural network comprises at least one layer; for one or more layers of the at least one layer, the method comprises: determining multiple groups of operators in the layer, wherein each group of operators corresponds to a group of processing parameters and is allocated with a memory resource having a predefined size; determining a maximum data amount processable by each group of operators per batch based on the corresponding group of processing parameters and the memory resource for each group of operators; loading, for each group of operators, the corresponding group of processing parameters into a memory; and using the multiple groups of operators to process input data received by the layer according to the respective maximum data amounts processable by the multiple groups of operators per batch.

11 Claims, 7 Drawing Sheets

METHOD FOR PROCESSING DATA USING A NEURAL NETWORK

TECHNICAL FIELD

This application relates to the field of neural network, and particularly relates to a method for processing data using a neural network.

BACKGROUND

The neural network is a machine learning model using one or more layers to process data, and to calculate an inference, wherein each layer has one or more operators corresponding to some processing parameters, the operators may be used to process input data entries received by this layer. The output data entry (i.e., inference result) processed by each layer may be used as an input data entry for the next layer.

In general, the neural network may be implemented using a specific hardware circuit. This hardware circuit may be a circuit including one or more non-volatile computer readable storage medium (e.g., memory), wherein the storage medium is used to store the data entries for inputting to the neural network and the processing parameters for processing data. However, the hardware circuit usually has limited memory resources, for example, an on-chip memory having a predefined size is integrated to the hardware circuit, so it is usually hard for the neural network to efficiently load the processing parameters of the operators, and it increases the cost of the hardware resources.

Therefore, it is necessary to provide an improved method for processing data using a neural network.

SUMMARY

This application is provided an improved method for processing data using a neural network to enhance the efficiency of loading and using the processing parameters.

In one aspect of the application, a method for processing data using a neural network is provided. The neural network comprises at least one layer, wherein for one or more layers of the at least one layer, the method comprises: determining multiple groups of operators in the layer, wherein each group of operators corresponds to a group of processing parameters and is allocated with a memory resource having a predefined size; determining a maximum data amount processable by each group of operators per batch based on the corresponding group of processing parameters and the memory resource for the group of operators; loading, for each group of operators, the corresponding group of processing parameters into a memory; and using the multiple groups of operators to process input data received by the layer according to the respective maximum data amounts processable by the multiple groups of operators per batch.

In some embodiments, the multiple groups of operators process the input data in parallel, and the step of using the multiple groups of operators to process input data received by the layer according to the respective maximum data amounts processable by the multiple groups of operators per batch further comprises: each group of operators respectively processing the input data received by the layer according to the maximum data amount processable by the group of operators per batch.

In some embodiments, the multiple groups of operators process the input data serially, the step of using the multiple groups of operators to process input data received by the layer according to the respective maximum data amounts processable by the multiple groups of operators per batch further comprises: each group of operators sequentially processing data received thereby according to the respective maximum data amounts processable by the group of operators per batch, and then providing the processed data to a subsequent group of operators for further processing.

In some embodiments, the step of loading, for each group of operators, the corresponding group of processing parameters into a memory comprises, loading, for each group of operators, the corresponding group of processing parameters into the memory at one time.

In some embodiments, each group of operators processes same data.

In some embodiments, the multiple groups of operators corresponds to different maximum data amounts processable per batch, the step of using the multiple groups of operators to process input data received by the layer according to the respective maximum data amounts processable per batch comprises: the multiple groups of operators processing the input data received by the layer in batches of different numbers.

In another aspect of the application, a data processing device based on a neural network is provided. The neural network comprises at least one layer, wherein the device comprises a non-volatile computer storage medium on which one or more executable instructions are stored, and wherein for one or more layers of the at least one layer, the one or more executable instructions can be executed by a processor to perform the following steps: determining multiple groups of operators in the layer, wherein each group of operators corresponds to a group of processing parameters and is allocated with a memory resource having a predefined size; determining a maximum data amount processable by each group of operators per batch based on the corresponding group of processing parameters and the memory resource for each group of operators; loading, for each group of operators, the corresponding group of processing parameters to a memory; and using the multiple groups of operators to process input data received by the layer according to the respective maximum data amounts processable per batch.

In yet another aspect of the application, a data processing device based on a neural network is provided. The data processing device comprises: a memory configured to store processing parameters corresponding to operators in the neural network and data to be processed by the neural network; a controller configured to control inputting and storing the data and the processing parameters into the memory, and then control providing the data and the processing parameters to a computing array such that the computing array executes computing operations in the neural network; wherein, the neural network comprises at least one layer, the operators in each layer are classified into groups; for each layer of the neural network, the controller is further configured to load a group of processing parameters corresponding to each group of operators into the memory, and to use the multiple groups of operators to process input data received by the layer according to maximum data amounts processable by the multiple groups of operators per batch.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION

Figure 1:
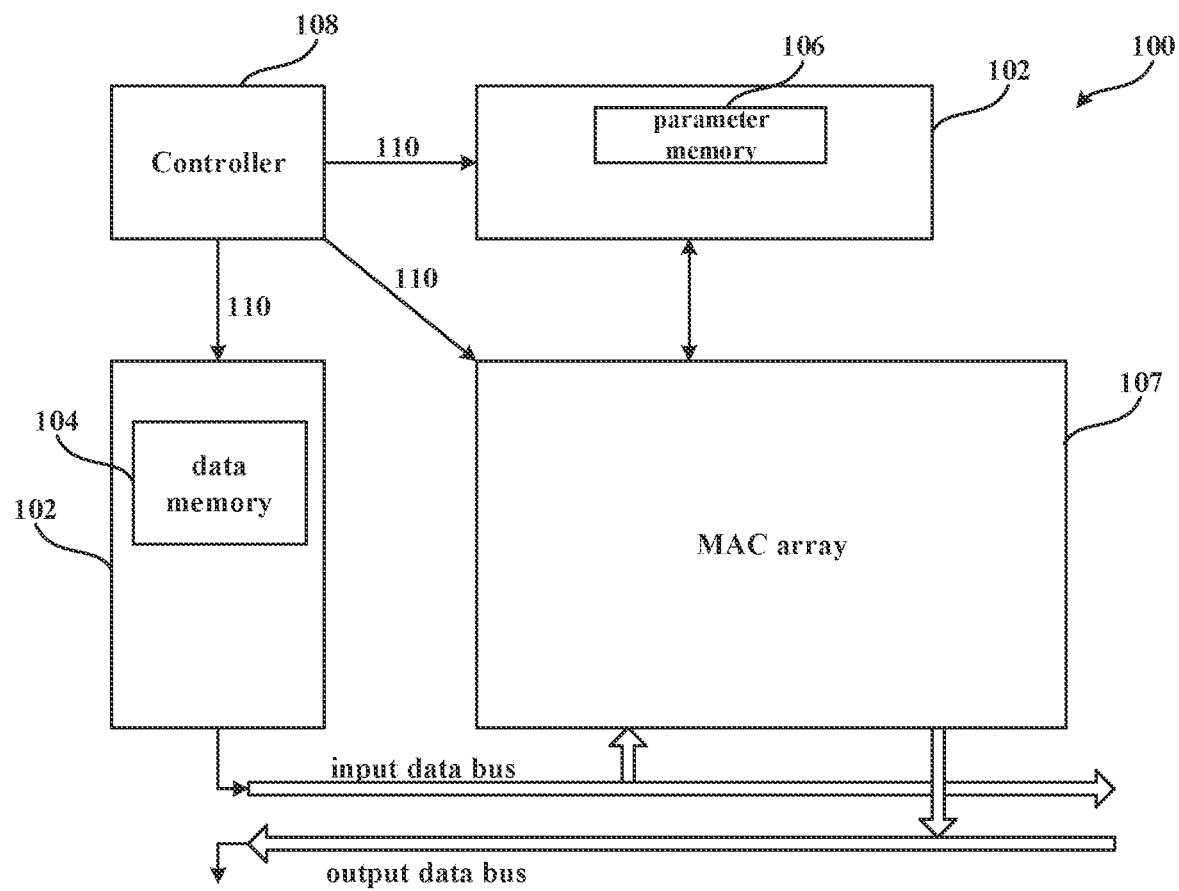
FIG. 1 depicts a hardware circuit for implementing a neural network according to an embodiment of the present application.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed, and other changes may be made without departing from the spirit or scope of the subject matter of the present application. It is to be understood that various configurations, substitutions, combinations, and designs of the various forms of the present application, which are generally described in this application and are illustrated in the drawings, are intended to constitute a part of the present application.

FIG. 1 depicts a hardware circuit 100 for implementing a neural network according to an embodiment of the present application. In some embodiments, the neural network may include one or more layers, wherein each layer corresponds to a group of processing parameters. In some embodiments, the neural network may compute the inference through the plurality of layers in a certain order, and each layer has one or more corresponding groups of processing parameters, each group of processing parameters can be constructed as a matrix or a tensor. In some embodiments, any layer of the neural network can receive a plurality of input data entries, and/or generate and output a plurality of inference computation results. Alternatively, the inference computation results outputted by one layer can be an input for the next layer. Different layers may have different functions (e.g., an input layer, an output layer, a hidden layer etc.) and receive different data entries depending on their specific positions in the neural network.

As shown in FIG. 1, the hardware circuit 100 for implementing the neural network may include a memory 102 and a controller 108. The controller 108 can provide control signals 110 indicative of various functions and operations for controlling the executions of other modules of the hardware circuit 100. For example, the control signals 110 can be used to control inputting and storing the data into a data memory 104, and subsequently providing these data entries to a MAC array 107 including a plurality of Multiply Accumulate (MAC) units or a similar computing array via an input data bus such that the computing operations are executed by the MAC array 107, in particular, these data entries are computed by the MAC array 107. For another embodiment, the control signals 110 may further store the processing parameters corresponding to operators into a parameter memory 106, and subsequently load these processing parameters into the MAC array 107 when the MAC array 107 is computing. It should be understood that the controller 108 may include one or more processing units and/or memories, and these processing units can invoke and execute the instructions stored in the memory such that the hardware circuit 100 executes one or more functions according to an embodiment. The processing unit in the controller 108 may use CPU (Central Processing Unit), GPU (Graphic Processing Unit), DSP (Digital Signal Processing circuit), ASIC (Application Specific Integrated Circuit) or other similar hardware implementations, or may use software or firmware or a combination thereof. The memory in the controller 108 may include one or more volatile and/or nonvolatile machine-readable storage mediums, for example, solid state memory, disk, optical disk, optical disc, Random Access Memory (RAM), Read-Only Memory (ROM), Erasable Programmable Read-Only Memory (e.g., EPROM, EEPROM or flash EPROM), or any other type of suitable storage medium.

As mentioned above, the parameter memory 106 and the data memory 104 form a memory 102 together. Limited by a practical hardware resource of the hardware circuit, the memory 102 and the parameter memory 106, the data memory 104 therein typically have limited memory resources. It should be noted that although the data memory 104 and parameter memory 106 are shown as two separated memory modules in FIG. 1, in some embodiments, the data memory and the parameter memory may also be integrated into one memory module, for example, the memory module has different memory regions for storing data and processing parameters. For a given computation period, the hardware circuit 100 may need to access the data memory 104 and the parameter memory 106 to execute the computation operations associated with the inference computation of each layer of the neural network. In particular, when the hardware circuit 100 receives the input data entries and the processing parameters, the controller 108 may execute one or more accessing operations for the memory 102, for example, storing the input data entries into the data memory 104, or storing the processing parameters into the parameter memory 106. In addition, the controller 108 may also extract these data entries/processing parameters and provide to the MAC array 107 for corresponding computations.

In the prior art, to reduce the access to the memory 102, the input data entries and other data entries to be processed are usually processed in batches, i.e., divide a certain data amount into a batch, and subsequently process the batch of data together. Furthermore, when the data is batched, the processing parameters will be invoked and loaded as units of layers of the neural network. The inventor of the present application found that because the plurality of operators in same layer need to be coordinated with each other (especially in the case of limited hardware resources), this method for calling processing parameters by layer will reduce the maximum data amounts that can be processed per batch, thereby the data processing efficiency of the neural network is reduced. To solve the problem, the inventor of the present application proposes a method for dispatching the processing parameters and the data entries as units of operators, this method may avoid the impact of data processing efficiency caused by the conflicts and differences of processing capabilities of different operators, thereby the data processing efficiency is improved.

Still referring to FIG. 1, in some embodiments, the neural network may have one or more layers, wherein each layer includes multiple groups of operators, each group of operators may include one or more operators which may jointly process same data, the output data entry of each layer may be outputted via an output bus. In addition, these groups of operators may correspond to same or different computation types, for example each group of operators may be used to perform one of the following computation types: convolution (conv) computation, element-wise computation, batch normalization (BN) computation, merge computation etc. In some embodiments, the plurality of operators included in each group of operators may respectively realize different processing functions, and jointly realize one type of computation operation. For example, for a group of operators used to perform convolution computations, it may include processing functions such as Convolution Direct Memory Access (CDMA), Convolution Sequencer Controller (CSC), Convolution Multiplier and Accumulation (CMAC), Convolution Accumulator (CACC). When these operators process common data, the convolution computations can be realized. It should be understood that the foregoing division of the group of operators for convolution computations is merely illustrative. In practical applications, convolution computations may use other operator division methods according to different specific implementations. When performing convolution computations, a required group of processing parameters (i.e., weight parameters) needs to traverse the matrix of the input data entry, and vector computations (calculate dot product) should be performed between the required group of processing parameters and each submatrix of the matrix to obtain an accumulated value. For example, for a group of weight parameters, the neural network may multiply each weight parameter with each input data entry, and sum the product to obtain an accumulated value. It should be understood that, for each group of operators, since it generally processes same data entry together, it may have one corresponding group of processing parameters. In the embodiment of the present application, each group of operators may process data in batches. In other words, each group of operators may process a certain data amount in one batch, and then simultaneously output the processed data entry. As such, in the next batch, this group of operators may similarly process another batch of data entries until all data entries to be processed by this group of operators are finished.

In a practical application, limited by the hardware resource invokable for the hardware circuit, each group of operators is usually allocated with a memory resource with a predefined size for storing a corresponding group of processing parameters. It should be understood that, for each group of operators, based on the number of its corresponding group of processing parameters and the size of the allocated memory resource, a maximum of data amount that can be processed by the group of operators per batch can be determined, which usually can be determined by the designer of the neural network based on experience. For example, the network features (the size of the matrix, the number of layers, the number of channels, etc.) of the operators, the data formats of the input data entries inputted into the operators, and the hardware implementation cost are all factors to be considered in determining the maximum data amount that can be processed per batch. For example, where the other conditions are not changed, the more complex the network features of the operators are, the smaller the maximum data amounts that can be processed by the operators per batch are. For another embodiment, the format difference between the input data entry and the network design of the operators needs to be resolved by preprocessing the input data entry, while preprocessing occupies a certain hardware resource, thereby the maximum data amounts that can be processed by the operators per batch become small. Furthermore, in some embodiments, the memory resources can be reused due to parallel operators. It should be understood that in some cases where the maximum data amount that can be processed by each group of operators per batch can be computed through predesigned rule and algorithm, the present application does not limit it to be determined by the designer or other person based on experience. In addition, it should be noted that although the maximum data amount that can be processed by each group of operators can be determined, in a practical processing, the data amount that can be processed by each group of operators per batch may be less than or equal to the maximum data amount.

It should be noted that, for each group of operators, when it is processing multiple batches of data, the processing parameters corresponding to this group of operators can be loaded into the memory (for example, the parameter memory 106 shown in FIG. 1) all the time, there is no need to repeatedly load this group of processing parameters many times. Preferably, when this group of operators completes processing the input data stored in the data memory 104 in batches, the memory region of the parameter memory 106 occupied by the processing parameters of this group of operators will be released such that the processing parameters required by other operators can be stored therein.

Figure 2:
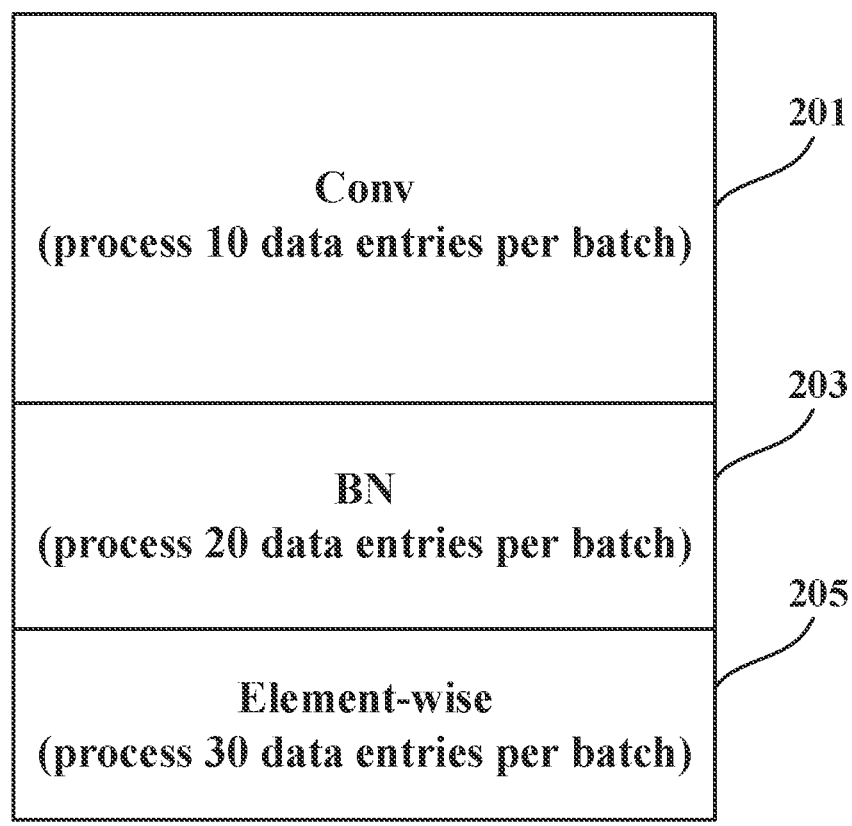
FIG. 2 is a schematic diagram showing an allocation of memory resources when the hardware circuit is executing according to an embodiment of the present application.

It should be understood that, in a practical application, in order to realize data processing of one layer of the neural network, each layer may include multiple groups of operators, which respectively correspond to a group of processing parameters and are allocated with memory resource having a predefined size. FIG. 2 is a schematic diagram showing an allocation of memory resources when the hardware circuit is executing according to an embodiment of the present application. It should be understood that the neural network implemented by the hardware circuit may include a plurality of layers, so the memory resources allocation diagram shown in FIG. 2 is a schematic diagram when one layer of the neural network is implemented by the hardware circuit.

As shown in FIG. 2, this layer illustratively includes three regions, i.e., a first memory region 201, a second memory region 203 and a third memory region 205, those are respectively used to store a group of processing parameters required by three groups of operators (i.e., conv operators, element-wise operators, BN operators) when those operators are processing. In some embodiments, each memory region is used to store the processing parameters of an assigned operator, so when each layer actually processes data, these memory regions will not be reused, i.e., the first memory region 201 will not store the processing parameters corresponding to the element-wise operators or the BN operators, the second memory region 203 or the third memory region 205 will not store the processing parameters corresponding to the conv operators. It should be noted that the numbers of the groups of the operators and the function types of the operators included in each layer are merely schematic. In a practical application, each layer may include 2 groups of, 4 groups of, 5 groups of or more groups of operators, and may also include operators for implementing functions, such as may include pooling operators, Rectified Linear Unit (ReLU) operators, etc.

As mentioned before, each layer of the neural network may process data in batches. Based on the respective memory capacities of the first memory region 201, the second memory region 203 and the third memory region 205, and the sizes of the group of processing parameters respectively corresponding to the conv operators, the BN operators and the element-wise operators, the maximum data amounts that can be processed by these operators can be computed. For example, in the embodiment shown in FIG. 2, it is assumed that the conv operators can process at most 10 data entries per batch, the BN operators can process at most 20 data entries per batch, and the element-wise operators can process at most 30 data entries per batch. Assuming that the number of input data entries received by the input node 1 of this layer is 60, then the conv operators need to finish processing all data entries in 6 batches, the element-wise operators need to finish processing all data entries in 2 batches, and the BN operators need to finish processing all data entries in 3 batches.

Figure 3:
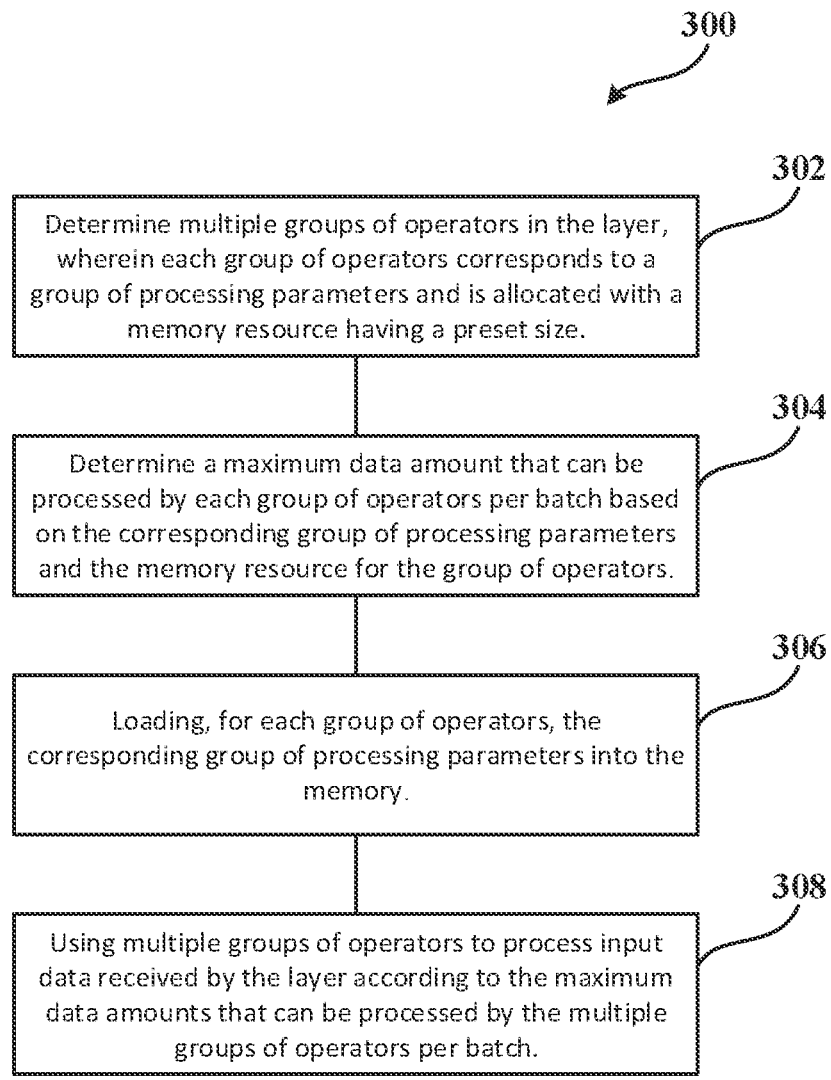
FIG. 3 depicts a method for processing data using a neural network according to an embodiment of the present application.

Based on the above description, the neural network can be implemented using the hardware circuit shown in FIG. 1, and the neural network is used to process data. FIG. 3 depicts a method 300 for processing data using a neural network according to an embodiment of the present application. It should be noted that the neural network usually may include at least one layer, one or more layers of these layers may respectively use the method 300 for processing data received by the layers. The method 300 merely illustratively describes at least a part of steps required by one layer to process data, those skilled in the art may understand that other layers of the neural network may use similar or same steps to process data. In addition, it should be understood that, for a neural network having a plurality of layers, the method for processing data according to an embodiment of the present application may also be used in a part of the layers of this neural network, and the other part of the layers may use other method for processing data.

As shown in FIG. 3, in step 302, determine multiple groups of operators in the layer, wherein each group of operators corresponds to a group of processing parameters and is allocated with a memory resource having a predefined size.

In some embodiments, a group of operators can be a plurality of operators that process same data jointly. For example, the foregoing group of operators for convolution computation; when theses operators process common data, the convolution computation is implemented. For example, the group of the processing parameters corresponding to each group of operators may be one or more parameter matrixes, for example that may be allocated with the corresponding memory resource according to the method shown in FIG. 3. In some embodiments, classifications of different operators can be implemented through providing a predefined mapping algorithm. For example, the operators related to a convolution matrix (for example a conv2d operator, a conv1d operator, a depthwise_conv2d operator, a fully_connected operator, etc.), the operators related to an element-wise (an add operator, a sub operator, a mul operator, an abs operator, a sin operator, a cos operator, a sqrt operator, etc.) may be classified together, and the pool operator may be classified as a separate category. In some embodiments, the controller may determine which operators are in the same group based on the requirement of data processing, and then the controller aggregates or determines these operators into same group. For another embodiment, the classification of the operators can also be implemented through other automated algorithm.

Next, in the step 304, determine a maximum data amount that can be processed by each group of operators per batch based on the corresponding group of processing parameters and the memory resource of the group of operators.

For example, through computation, a current layer of the neural network includes 3 groups of operators, i.e., the conv operators (for implementing convolution computation herein), the BN operators, the element-wise operators, the maximum data amount that can be processed by these operators respectively are 10, 20 and 30.

Next, in step 306, load, for each group of operators, the corresponding group of processing parameters into the memory. As mentioned before, in the embodiment of the present application, the processing parameters of the operators in various layers of the neural network are loaded based on each group of operators as a unit, rather than based on each layer as a unit. In other words, for the example shown in FIG. 2, the 3 groups of processing parameters corresponding to the 3 groups of operators can be simultaneously loaded into their allocated memory regions together, or can be sequentially loaded into their allocated memory regions.

Then, in step 308, use the multiple groups of operators to process input data received by the layer according to the respective maximum data amounts that can be processed by the multiple groups of operators per batch.

In a layer of the neural network, there may be different connections between different operators, such as parallel connections or serial connections. In a mode of parallel connection, all operators in one layer compute relatively independently and in parallel, each operator processes the input data received by this layer respectively based on the maximum data amounts that can be processed by the operator per batch. In a mode of serial connection, all operators in one layer also compute relatively independently, each operator processes the received input data respectively based on the maximum data amount that can be processed by the operator per batch, and then provides the processed data for the subsequent group of operators for further processing. Regardless of the serial connection or parallel connection between different groups of operators, it is more effective to use the method for processing data according to the embodiment of the present application for processing the processing parameters to load and use.

Next, steps 306 and 308 of the method for processing data will be specifically described with reference to the examples according to the present application. The examples herein assume that the input data entries are 60, and includes 3 groups of operators, i.e., the conv operators, the BN operators and the element-wise operators. The maximum data amounts that can be processed by these operators per batch are respectively 10, 20 and 30. For the convenience of expression, the plurality of operators required by convolution computations are all referred as conv operators, other groups of operators are processed similarly.

In the mode of serial connection, when the input data entries are 60, the conv operators need to complete processing all the input data entries in 6 batches, meanwhile the group of processing parameters required by the conv operators is loaded at one time and reused in 6 batches. Similarly, the BN operators need to finish processing all the input data entries in 3 batches, meanwhile the group of processing parameters required by the BN operators is loaded at one time and reused in 3 batches. The element-wise operators need to finish processing all the input data entries in 2 batches, the group of processing parameters required is loaded at one time and reused in 2 batches. When the three groups of operators all finish processing the input data entries, the processed results can be outputted through the output node 2 and provided to a next layer for processing.

Figure 4A:
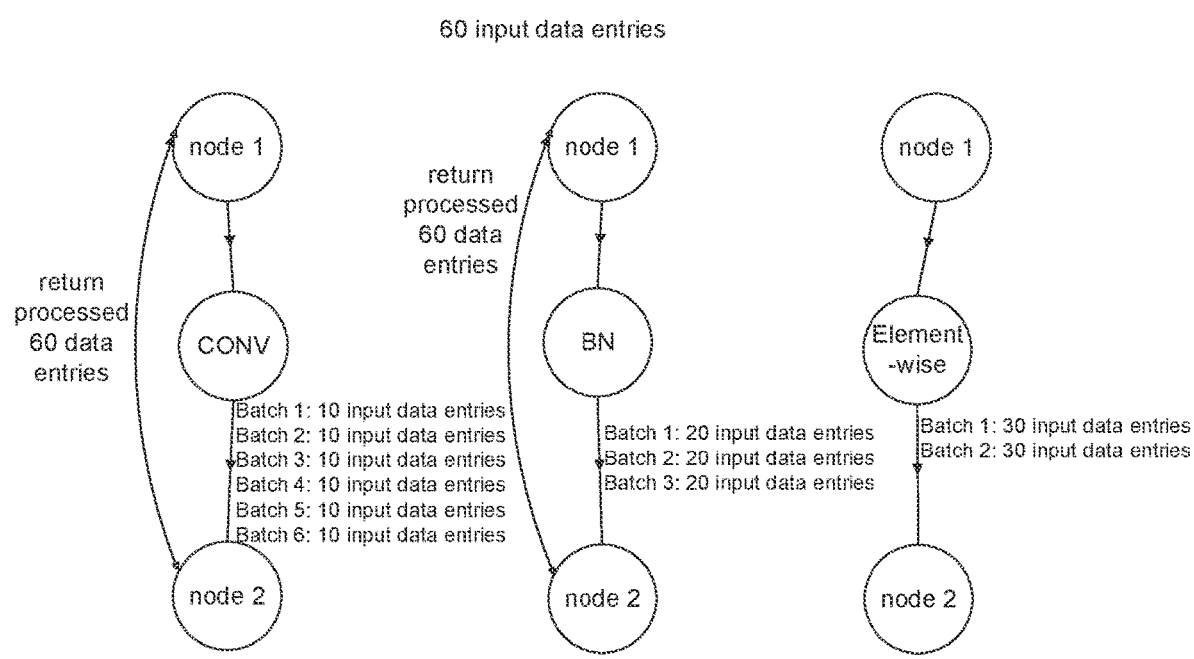
FIG. 4a is a schematic diagram showing multiple groups of operators in one layer of the neural network process data in parallel according to an embodiment of the present application.

FIG. 4a is a schematic diagram showing multiple groups of operators in one layer of the neural network process data in parallel according to an embodiment of the present application. As shown in FIG. 4a, the 3 groups of processing parameters corresponding to the 3 groups of operators have been preloaded into memory. As such, in the first batch 1, the conv operators process 10 data entries, the BN operators process 20 data entries, and the element-wise operators process 30 data entries. In the second batch 2, the conv operators continue to process 10 data entries, the BN operators continue to process 20 data entries, while the element-wise operators continue to process 30 data entries (i.e., the 60 data entries are finished), meanwhile the memory resources occupied by the processing parameters corresponding to the element-wise operators can be released. In the third batch 3, the conv operators continue to process 10 data entries, the BN operators continue to process 20 data entries (i.e., the 60 data entries are finished), meanwhile the memory resources occupied by the processing parameters corresponding to the BN operators can be also released. In the fourth batch 4 to the sixth batch 6, the conv operators continue to process 10 data entries per batch until all the 60 data entries are finished, the memory resources occupied by the processing parameters corresponding to the conv operators can also be released. The processed results of each group of operators can be outputted through the output node 2.

Figure 4B:
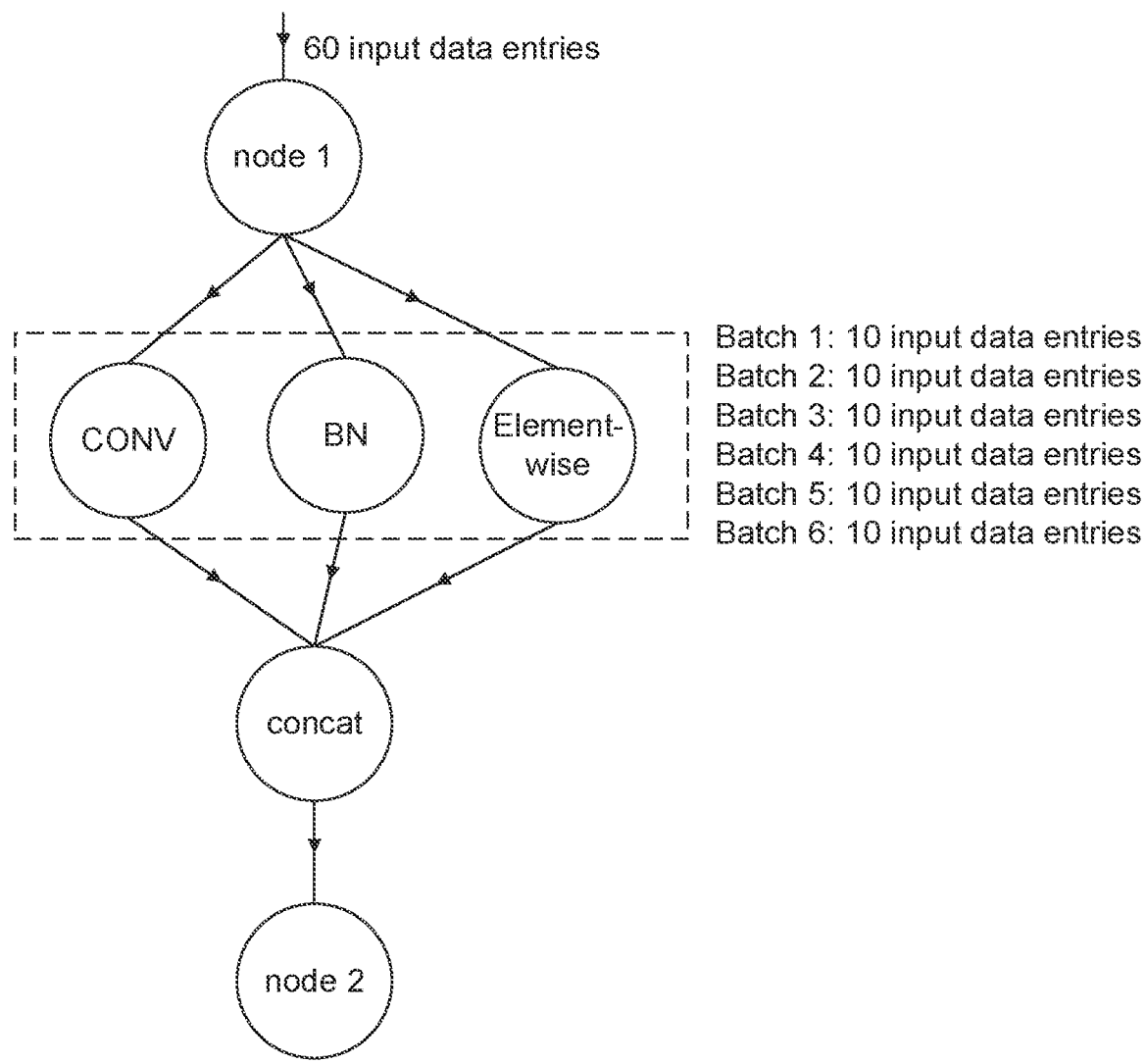
FIG. 4b is a schematic diagram showing multiple groups of operators in one layer of an existing neural network process data in parallel.

FIG. 4b is a schematic diagram showing multiple groups of operators in one layer of an existing neural network process data in parallel. As shown in FIG. 4b, the 3 groups of processing parameter required by the 3 groups of operators are loaded into layers, so the maximum data amount to be processed per batch is determined by the group of operators who have the lowest processing capability. As shown in the example of FIG. 4b, the conv operators are that group of operators who have the lowest processing capability, so only 10 data entries can be processed per batch. In addition, due to the requirement of accuracy for processing data, when the processing parameters are loaded into layers in the prior art, the processing parameters cannot be reused. In other words, the data are processed based on a layer as a unit according to the prior art, each layer can only process a fixed data amount, only when all the operators in the layer finish processing, the next processing can be executed (e.g., process the data from the next layer, or load some other data entries into this layer for processing). During the processing in layers, the parameters loaded in the memory are the parameters of the last operator. So, when new data entries enter same layer, the parameters of the first operator need to be reloaded into the memory, the parameters that have been loaded in the memory cannot be reused. So, after finish each batch, all processing parameters required by the operators in the layer need to be reloaded. For example, as shown in FIG. 4b, in the first batch 1, the conv operators process 10 data entries, the BN operators and the element-wise operators process the same 10 data entries as well. Similarly, in the second batch 2 to the sixth batch 6, the conv operators, the BN operators and the element-wise operators also process the same 10 data entries per batch as well until the 60 data entries are finished. The processed results can be further processed by concat operator and then outputted through the output node 2.

It can be seen that, compared with the existing method for processing data shown in FIG. 4b, the method for processing data according to the embodiment of the present application can process a maximum data amount that can be processed by each group of operators per batch, and these processing parameters can be reused without reloading. That is, processing based on operators as a unit will group a plurality of data entries to be processed in same layer and process the plurality of data entries sequentially, which can minimize or avoid reloading parameters. Therefore, the method for processing data of the present application can reduce the run-time overhead of the memory resources.

Compared with the method for processing data in the prior art, loading the processing parameters according to operators also has advantage for the neural network in which a plurality of operators are serially connected.

Figure 5A:
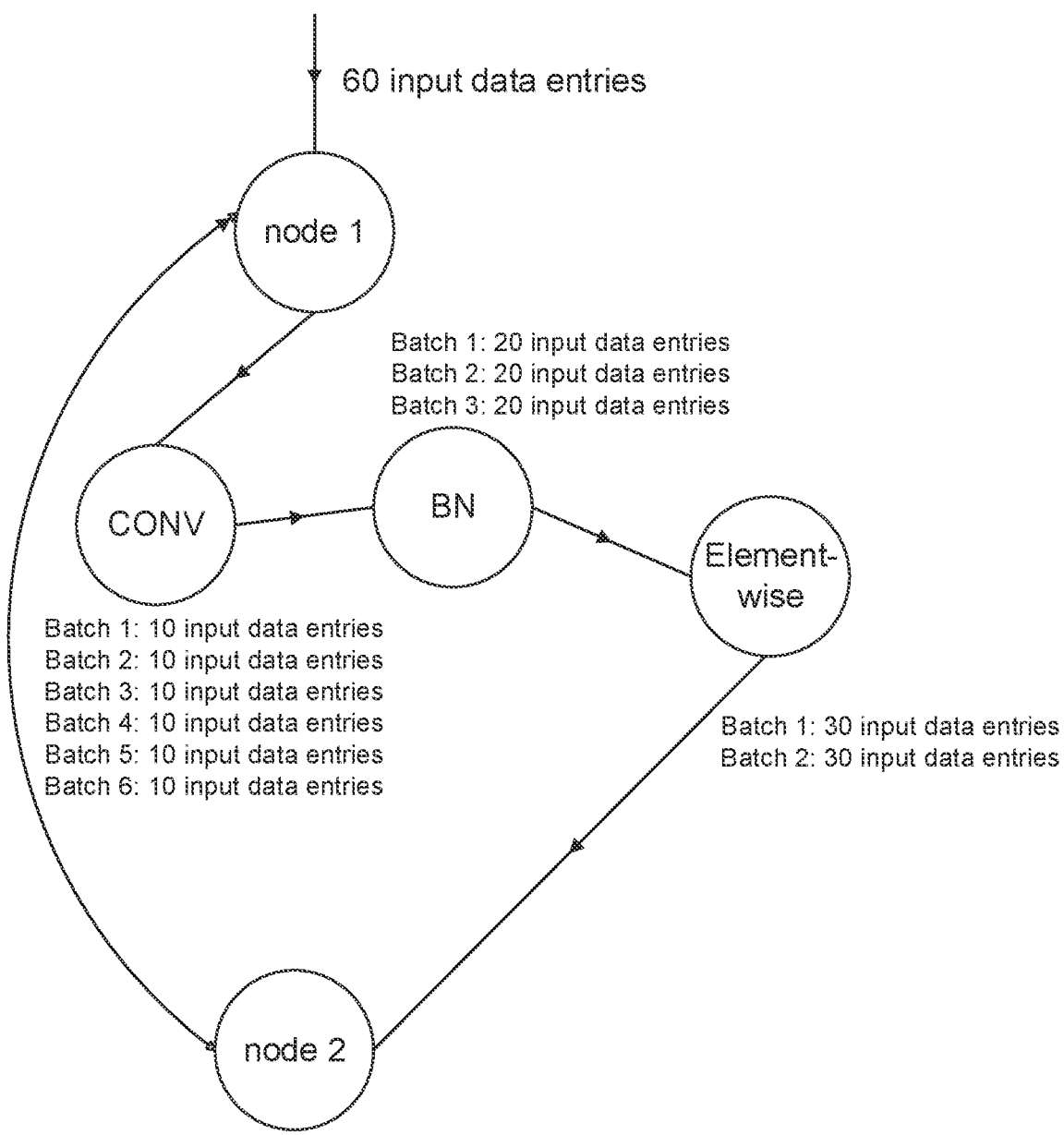
FIG. 5a is a schematic diagram showing multiple groups of operators in one layer of the neural network process data serially according to an embodiment of the present application.

FIG. 5a is a schematic diagram showing multiple groups of operators in one layer of the neural network process data serially according to an embodiment of the present application. As shown in the FIG. 5a, the conv operators receive input data entries from an input node 1, the data entries processed by the conv operators will be provided to the next BN operators, and the data entries processed by the BN operators will be provide to the next element-wise operators. The data entries processed by the element-wise operators can be outputted by the output node 2.

In particular, in the process where the 3 groups of operators are processing data, the conv operators at the foremost stage can process at most 10 data entries per batch, so 60 data entries can be processed in 6 batches after loading the group of processing parameters corresponding to the conv operators at one time; meanwhile, the processing parameters required by the BN operators and the element-wise operators do not need to be loaded into the memory, the memory resources can be reallocated to execute other computations. After the conv operators finish the 60 data entries, the memory resources occupied by the processing parameters of the conv operators may be released; meanwhile, the group of processing parameters required by the BN operators can be loaded into the memory at one time, and execute the computation in 3 batches (20 data entries per batch) to process the 60 data entries. Similarly, after then, the memory resources occupied by the processing parameters of the BN operators can be released; meanwhile, the group of the processing parameter required by the element-wise operators can be loaded into the memory at one time, and execute the computation in 2 batches (30 data entries per batch) to process the 60 data entries.

Figure 5B:
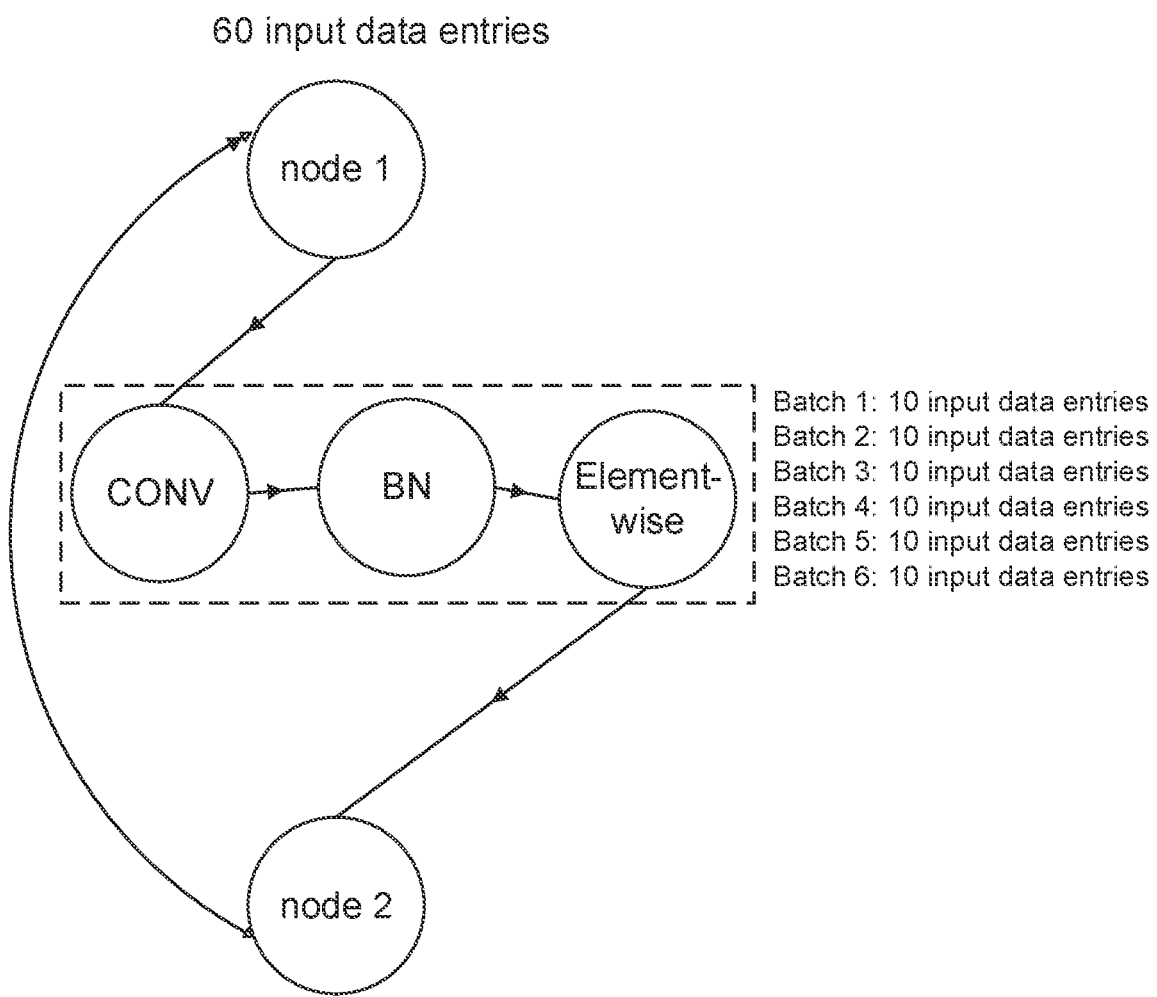
FIG. 5b is a schematic diagram showing multiple groups of operators in one layer of an existing neural network process data serially.

FIG. 5b is a schematic diagram showing multiple groups of operators in one layer of an existing neural network process data serially. As shown in FIG. 5b, 3 groups of processing parameters required by 3 groups of operators (i.e., the conv operators, the BN operators and the element-wise operators) in the same layer are loaded together, but the processing capability of this serial processing path is also limited by the processing capability of a conv operator which has the lowest processing capability per batch (i.e., processing 10 data entries per batch). Therefore, in the implementation of the prior art, at least 6 batches are used to process 60 data entries, wherein each batch processes 10 data entries. In addition, all the 3 groups of processing parameters are loaded together, so this method still occupies more memory resources.

In some embodiments, the present application also provides some computer program products including a non-volatile computer readable storage medium. The non-volatile computer readable storage medium includes computer executable codes for performing the steps in the method embodiment shown in FIG. 3. In some embodiments, the computer program products can be stored in a hardwire device.

The embodiments of the present application can be implemented in hardware, software or a combination thereof. The hardware portion can be implemented using dedicated logic; the software portion can be stored in a memory and performed by suitable instruction performing system, such as microprocessor or dedicated design hardware. Those skilled in the art will appreciate that the device, and method of the present application can be implemented by using computer-executable instructions and/or containing in a processor control code, for example those codes are provided on a carrier medium such as disk, CD or DVD-ROM, a programmable memory such as read-only memory (firmware), data carrier such as optical carrier or electronic signal carrier. For example, the device and modules of the present application can be implemented in very large-scale integrated circuit or gate array, semiconductor such as logic chip, transistor, hardware circuit of programmable hardware device such as field-programmable gate array, programmable logic devices, can also be implemented in software executed by various types of processors, can also be implemented in a combination of foregoing hardware circuits and software such as firmware.

Those skilled in the art will be able to understand and implement other changes to the disclosed embodiments by studying the specification, disclosure, drawings and appended claims. In the claims, the wordings "comprise", "comprising", "include" and "including" do not exclude other elements and steps, and the wordings "a" and "an" do not exclude the plural. In the practical application of the present application, one component may perform the functions of a plurality of technical features cited in the claims. Any reference numeral in the claims should not be construed as limit to the scope.

What is claimed is:

1. A method for processing data using a neural network comprising at least one layer, wherein for one or more layers of the at least one layer, the method comprising:

determining multiple groups of operators in the layer, wherein each group of operators corresponds to a group of processing parameters and is allocated with a memory resource having a predefined size;

determining a maximum data amount processable by each group of operators per batch based on the corresponding group of processing parameters and the memory resource for the group of operators;

loading, for each group of operators, the corresponding group of processing parameters into a memory; and using the multiple groups of operators to process input data received by the layer according to the respective maximum data amounts processable by the multiple groups of operators per batch.

2. The method of claim 1, wherein the multiple groups of operators process the input data in parallel, and the step of using the multiple groups of operators to process input data received by the layer according to the respective maximum data amounts processable by the multiple groups of operators per batch further comprises:

each group of operators respectively processing the input data received by the layer according to the maximum data amount processable by the group of operators per batch.

3. The method of claim 1, wherein the multiple groups of operators process the input data serially, the step of using the multiple groups of operators to process input data received by the layer according to the respective maximum data amounts processable by the multiple groups of operators per batch further comprises:

each group of operators sequentially processing data received thereby according to the respective maximum data amounts processable by the group of operators per batch, and then providing the processed data to a subsequent group of operators for further processing.

4. The method of claim 1, wherein the step of loading, for each group of operators, the corresponding group of processing parameters into a memory comprises:

loading, for each group of operators, the corresponding group of processing parameters into the memory at one time.

5. The method of claim 1, wherein each group of operators processes same data.

6. The method of claim 1, wherein the operators are classified into the multiple groups according to a predefined mapping algorithm.

7. The method of claim 1, wherein the multiple groups of operators correspond to different maximum data amounts processable per batch, the step of using the multiple groups of operators to process input data received by the layer according to the respective maximum data amounts processable per batch comprises:

the multiple groups of operators processing the input data received by the layer in batches of different numbers.

8. A data processing device based on a neural network comprising at least one layer, wherein the device comprises a non-volatile computer storage medium on which one or more executable instructions are stored, and wherein for one or more layers of the at least one layer, the one or more executable instructions can be executed by a processor to perform the following steps:

determining multiple groups of operators in the layer, wherein each group of operators corresponds to a group of processing parameters and is allocated with a memory resource having a predefined size;

determining a maximum data amount processable by each group of operators per batch based on the corresponding group of processing parameters and the memory resource for the group of operators;

loading, for each group of operators, the corresponding group of processing parameters to a memory; and using the multiple groups of operators to process input data received by the layer according to the respective maximum data amounts processable per batch.

9. The device of claim 8, wherein the multiple groups of operators process the input data in parallel, and the step of using the multiple groups of operators to process input data received by the layer according to the respective maximum data amounts processable per batch further comprises:

each group of operators respectively processing the input data received by the layer according to the maximum data amount processable by the group of operators per batch.

10. The device of claim 8, wherein the multiple groups of operators process the input data serially, the step of using the multiple groups of operators to process input data received by the layer according to the respective maximum data amounts processable per batch further comprises:

each group of operators sequentially processing data received thereby according to the maximum data amount processable by the group of operators per batch, and then providing the processed data to a subsequent group of operators for further processing.

11. A data processing device based on a neural network, the data processing device comprising:

a memory configured to store processing parameters corresponding to operators in the neural network and data to be processed by the neural network;

a controller configured to control inputting and storing the data and the processing parameters into the memory, and then control providing the data and the processing parameters to a computing array such that the computing array executes computing operations in the neural network;

wherein the neural network comprises at least one layer, the operators in each layer are classified into groups; for each layer of the neural network, the controller is further configured to load a group of processing parameters corresponding to each group of operators into the memory, and to use the multiple groups of operators to process input data received by the layer according to maximum data amounts processable by the multiple groups of operators per batch.

* * * * *